United States Patent
Nguyen et al.

(10) Patent No.: US 9,104,826 B2
(45) Date of Patent: Aug. 11, 2015

(54) MONITORING COVERAGE FOR STATIC MODELLING OF AN ELECTRONIC DEVICE

(71) Applicants: Huy Nguyen, Austin, TX (US); Alan J. Carlin, Austin, TX (US); Hugo M. Cavalcanti, Austin, TX (US)

(72) Inventors: Huy Nguyen, Austin, TX (US); Alan J. Carlin, Austin, TX (US); Hugo M. Cavalcanti, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/078,857

(22) Filed: Nov. 13, 2013

(65) Prior Publication Data

US 2015/0135149 A1    May 14, 2015

(51) Int. Cl.
*G06F 17/50* (2006.01)

(52) U.S. Cl.
CPC .......... *G06F 17/5045* (2013.01); *G06F 17/505* (2013.01); *G06F 17/5022* (2013.01); *G06F 17/5027* (2013.01)

(58) Field of Classification Search
CPC ............ G06F 17/5022; G06F 17/5027; G06F 17/5045; G06F 17/505
USPC .......... 716/136, 106–107, 110–111, 116–117
See application file for complete search history.

(56) References Cited

U.S. PATENT DOCUMENTS

| | | | |
|---|---|---|---|
| 5,913,023 A | 6/1999 | Szermer | |
| 6,141,630 A * | 10/2000 | McNamara et al. | 703/14 |
| 6,964,029 B2 * | 11/2005 | Poznanovic et al. | 716/105 |
| 7,089,542 B2 | 8/2006 | Brand et al. | |
| 7,114,111 B2 * | 9/2006 | Noy | 714/738 |
| 7,240,243 B2 | 7/2007 | Decker | |
| 7,272,752 B2 | 9/2007 | Farchi et al. | |
| 7,305,649 B2 * | 12/2007 | Bellas et al. | 716/102 |
| 7,370,296 B2 | 5/2008 | Koyfman et al. | |
| 7,386,521 B2 | 6/2008 | Adir et al. | |
| 7,849,425 B1 | 12/2010 | Hamid et al. | |
| 2006/0150040 A1 * | 7/2006 | Bratt et al. | 714/724 |
| 2009/0249267 A1 * | 10/2009 | Cerny et al. | 716/5 |
| 2010/0042963 A1 * | 2/2010 | Bruno et al. | 716/10 |
| 2010/0185694 A1 * | 7/2010 | Copty | 707/803 |
| 2010/0218061 A1 * | 8/2010 | Sinanoglu et al. | 714/731 |

(Continued)

OTHER PUBLICATIONS

Liu et al., "A Technique for Test Coverage Closure Using GoldMine", IEEE Transactions on Computer-Aided Design of Integrated Circuits and Systems, vol. 31, No. 5, May 2012, pp. 790-803.

(Continued)

*Primary Examiner* — Stacy Whitmore

(57) ABSTRACT

A design verification system automatically identifies coverage of different constraints for a static model of an electronic device. The static model can be employed by a tool, referred to as a solver, that identifies whether the mathematical relationships of the static model can be reconciled, given a set of user-defined constraints that indicate a desired configuration, or range of configurations, of the electronic device. After a solution for a particular set of user-defined constraints has been identified, a constraints adjustment module can identify, based on coverage information generated by the solver, if other sets of user-defined constraints were implicitly solved by the solver. If such other sets were implicitly solved, the adjustments module can mark the sets as solved, such that they will omitted from constraints used for subsequent solutions of the solver.

14 Claims, 4 Drawing Sheets

(56) References Cited

U.S. PATENT DOCUMENTS

2011/0010091 A1* 1/2011 Currie et al. .................. 701/208
2011/0239182 A1* 9/2011 Nitta et al. .................... 716/135
2012/0278672 A1* 11/2012 Sinanoglu ..................... 714/726

OTHER PUBLICATIONS

Mottu et al., "Static Analysis of Model Transformations for Effective Test Generation", IEEE 23rd International Symposium on Software Reliability Engineering, 2012, pp. 291-300.

Sanghavi, "What is Formal Verification?", EE Times-Asia, www.eetasia.com, posted May 21, 2010, 2 pages.

Arora, "Enhancing Sat-Based Equivalence Checking With Static Logic Implications", Eighth IEEE International High-Level Design Validation and Test Workshop, Nov. 12-14, 2003, San Francisco, CA, pp. 63-68.

U.S. Appl. No. 14/078,853, filed Nov. 13, 2013, entitled "Static Modelling of an Electronic Device".

* cited by examiner

MONITORING COVERAGE FOR STATIC MODELLING OF AN ELECTRONIC DEVICE

CROSS-REFERENCE TO RELATED APPLICATIONS

The present application is related to U.S. patent application Ser. No. 14/078,853, filed on even date herewith and entitled "Static Modelling of an Electronic Device," the entirety of which is incorporated by reference herein.

BACKGROUND

1. Field of the Disclosure

The present disclosure relates generally to electronic devices and more particularly to testing and verification of electronic device designs.

2. Description of the Related Art

A typical design flow for an electronic device includes design verification, wherein the expected operation of the electronic device is compared to a device specification. Because of the expense of building test devices, the design verification is frequently conducted using software-based automated design tools that simulate the expected operation of the electronic device, as indicated by a data file reflecting the electronic device design (also referred to as a flowchart). Modern electronic devices often can be configured in a variety of different ways, and thus it is typically desirable to simulate operation of the electronic device under a variety of simulated conditions and configurations. However, because of the complexity of modern electronic devices, it can be difficult to efficiently simulate and verify particular configurations of an electronic device that could occur under expected operating conditions. Further, it can be time-consuming to verify operation of all possible configurations of interest for an electronic device.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION OF EMBODIMENT(S)

Figure 1:
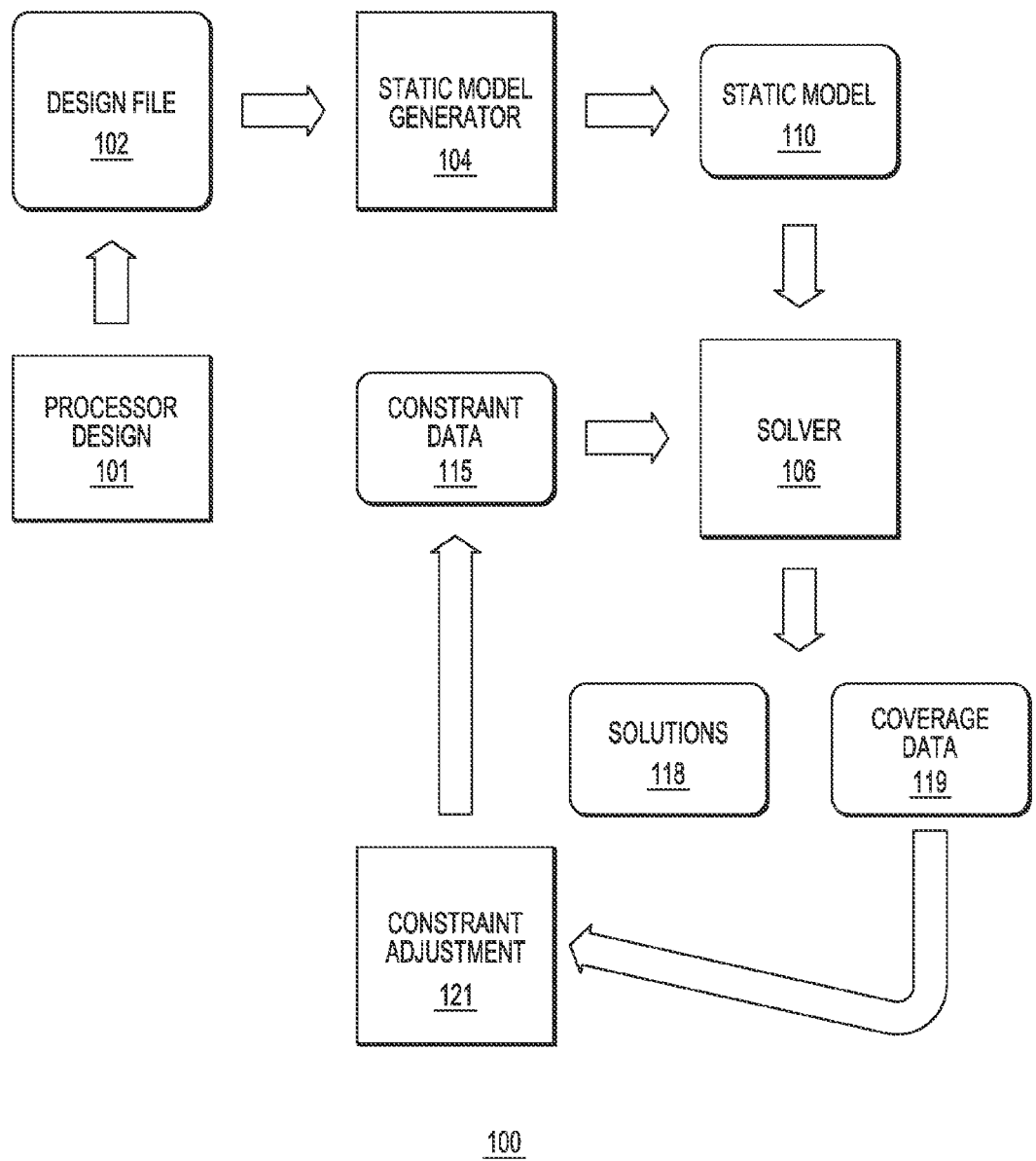
FIG. 1 is a block diagram of a design verification system employing a static model in accordance with at least one embodiment.

FIGS. 1-4 illustrate techniques for automatically identifying coverage of different constraints for a static model of an electronic device. The static model includes an expression of the relationships between modules of the electronic device and relationships between the behaviors of those modules that can be expressed as set of mathematical relationships. The static model does not include a time variable, but instead reflects a fixed set of relationships between the electronic device modules and between behaviors of the modules. A static model generator automatedly generates the static model based on a data file storing a description of the processor design, such as a hardware description language (HDL) file. The static model can be employed by a tool, commonly referred to as a solver, that identifies whether the mathematical relationships of the static model can be reconciled, given a set of user-defined parameters. The user defined parameters can fall into one of two categories: user constraints, which define one or more rules that the solver must obey for any and all solutions that are generated; and user coverage, that specify a rule that the solver must obey for at least one of its generated solutions. For purposes of discussion, data representing the user-defined parameters, including user constraints and user coverage, are referred to as "constraint data". After a solution for a particular set of constraint data has been identified, a constraints adjustment module can identify, based on coverage information generated by the solver, if other sets of constraint data were implicitly solved by the solver. If such other sets were implicitly solved, the adjustments module can mark the sets as solved, such that they will omitted from constraints used for subsequent solutions of the solver, thereby reducing test and verification time.

To illustrate, conventional verification techniques employ a dynamic model that reflects the predicted operation of an electronic device based on the design under test. The dynamic model includes a time variable, such that the state of the dynamic model evolves based on changes in the time variable. Specifically, under conventional verification techniques, an input stimulus is applied to the dynamic model and the dynamic model is allowed to evolve according to its model characteristics and the characteristics of the input stimulus. To test a particular configuration of the device design, a corresponding input stimulus must be applied to the dynamic model. Because a processor can have many different configurations, it can be difficult to identify appropriate input stimuli for all desired configurations of the processor to be tested. Accordingly, verification using dynamic models typically includes a battery of tests using a large set of random input stimuli. However, there is no guarantee that particular configurations of interest will be tested by the set of random input stimuli. Accordingly, ensuring that, for example, a particular user coverage rule has been used to achieve a dynamic solution can require hundreds, thousands, or even more tests using a dynamic model. In contrast, the input to a solver using a static model is a set of desired goals reflected in the user-defined constraints, wherein the solver gives yes/no answer as to whether the constraints can be reconciled with the static model. By supplying appropriate constraints to the solver, any given configuration of the processor design can be guaranteed to be verified using the static model. Accordingly, the static model can more flexibly and efficiently test configurations of interest. In particular, the upper bound on the number of tests required to test a particular configuration using a static model is deterministic, while the upper bound on the number of tests required to test the particular configuration using a dynamic model is not deterministic.

For a particular device design, there may be many configurations of interest that are to be solved. These different configurations of interest are stored as sets of user-defined constraints to be applied to the static model. The constraints for each configuration of interest can be applied to the static model by the solver, thereby generating an individual solution for each configuration of interest. However, a particular configuration of interest may imply other configurations of interest. That is, the equations of the static model may indicate that a particular configuration of interest results from the constraints associated configuration of interest. Because of the complexity of the static model, these implications may not be apparent when the constraints for each configuration of interest are generated. Under the techniques described herein, each time the solver generates a solution it also generates coverage data, indicating the configuration of the static model that resulted in the solution. The coverage data will therefore indicate both the configuration of nodes indicated by the user-defined set of constraints, and at least one configuration of other nodes of the static model implied by those constraints. A constraint adjustment module analyzes the coverage data to identify whether there are any configurations of interest that were implicitly solved by the solver during generation of a given solution and, if so, those configurations of interest (e.g. a particular coverage goal) are marked as complete (covered) or otherwise eliminated from the user-defined constraints. This reduces the number of overall solutions that need to be generated for a particular set of configurations of interest, thereby reducing testing time and resources.

As used herein, a "static model" is defined as a model of behavior of hardware, or hardware features of an electronic device, including the behaviors and relationships between the hardware and hardware features under specified conditions, that does not rely on a time variable. That is, the static model does not reflect changes in a processor device over time but instead reflects static relationships between elements of the electronic device. However, the static model can include or imply an order in which particular features or modes of hardware take place. Because the static model is a fixed set of relationships, it implies whether a particular set of inputs and outputs to the model can be reconciled (made "legal") based on a given set of user-defined parameters and the relationships intrinsic to the static model. In contrast, a dynamic model does not contain such an implication, but instead simply supplies output data evolved from a given set of input data. Further, in a static model, the state of any particular node representing a module, behavior, or feature of an electronic device can be set using a constraint, without regard to any particular set of inputs or outputs of the device design. Moreover, these constraints are fixed as it is determined by the solver how (if at all) the relationships indicated by the static model can be resolved to satisfy the constraints. In contrast, the states of individual nodes of a dynamic model cannot be individually set, but instead must be established by providing a particular set of input data to the dynamic model. In addition, the state of any particular node is not held fixed by the dynamic model, but instead is allowed to change as the dynamic model evolves in response to the input data.

FIG. 1 illustrates a design verification system 100 in accordance with at least one embodiment. The design verification system 100 is implemented at a computer system, such as a desktop computer, workstation, server, or combination thereof. The individual modules of the design verification system 100 described below can reflect individual or collective software programs, hardware devices, or combinations thereof. Further, although illustrated and described individually, each of the modules described below can represent a portion of a larger software program, hardware device, or combination thereof.

The design verification system 100 is generally configured to verify one or more aspects of an electronic device design. For purposes of description, the design verification system 100 is described with respect to a processor design 101. However, it will be appreciated that the techniques disclosed herein can be applied to other electronic device designs, including integrated circuit designs, system-on-a-chip designs, consumer electronic device designs, and any device design that can be described in the form of a flow chart. In addition, although the design verification system 100 is described in the context of device verification, it will be appreciated that the static modeling techniques described herein can be employed in other contexts, such as validation, generation of register transfer level (RTL) code, and the like.

The processor design 101 reflects the modules of a potential processor device, or portions thereof, the behavior of those modules, and the relationships between the modules and their behaviors. The processor design 101 can be a data file, a written set of device specifications, a conceptual framework for processor, or a combination thereof. In at least one embodiment, the processor design 101 is instantiated as a design file 102 that embodies a flowchart or decision tree that describes features of a processor, or the interpretation of processor features by a designer that created the flow chart or decision tree. For purposes of description, the design file is also referred to herein as "flowchart 102." In at least one embodiment, the flowchart 102 is set forth in a machine interpretable data file, such as a hardware description language (HDL) file in compliance with the Verilog™ hardware description language, that describes the modules, behaviors, and relationships reflected in the processor design 101 in a format that can be interpreted by one or more computer aided design tools. For example, in one embodiment, the flowchart 102 includes a declaration section that identifies each element of the processor design 101, a relationship section that defines relationships between the elements in the flowchart 102, and a behaviors section that reflects behaviors or features of the processor design 101. As used herein, an element of the processor design 101 refers to a module of the processor design 101 at a particular level of granularity. Thus, for example, in at least one embodiment an element of the processor design is a logic gate. In another embodiment an element of the processor can be a higher-order module, such as a processor core or memory controller. The flowchart 102 can represent different elements of the processor design 101 at different levels of granularity. For example, one module of the processor design 101 can be represented at the level of a logic gate, while another module is represented at a higher-order level.

The design verification system 100 includes a static model generator 104 to generate a static model 110 based on the flowchart 102. As described further herein, the static model generator identifies the elements of the flowchart 102, and the relationships between those elements. For example, in at least one embodiment, each element of the flowchart 102 that describes a particular processor module or module behavior or mode is referred to as a node of the flowchart 102. The relationships between the nodes, as indicated by the flowchart 102, are referred to as arcs. The static model generator 104 includes a node parser to identify the nodes as indicated by the declarations section of the flowchart 102. In addition, the static model generator 104 includes a relationships parser that identifies, based on the relationship section of the flowchart 102, arcs between the nodes of the flowchart 102.

Based on the nodes and arcs of the flowchart 102, the static model generator 104 generates the static model 110 to have at least two aspects: a set of node variables and a set of arc variables. Each node variable corresponds to at least one of: 1) an element of the processor design; or 2) a particular mode or behavioral aspect of an element of the processor design. Thus, for example, if the processor design 101 includes a processor core that can be placed in either a low-power mode or an active mode, the node variables of the static model 110 can include one node variable to correspond to the processor core, one node variable to correspond to the low-power mode, and one node variable to correspond to the active mode of the processor core. In at least one embodiment, the static model generator 104 generates the list of node variables as a hierarchical tree, referred to as a node variable tree.

Each of the arc variables of the static model 110 corresponds to a relationship between two node variables, representing a corresponding relationship between nodes of the flowchart 102. The node whose node variable is higher in the node tree for a given arc is referred to as the parent node for that arc and the node whose node variable that is lower in the node variable tree is referred to as the child node for the arc. There is typically only one arc between a parent node and a child node. Thus, in the example above, there is one arc between the node corresponding to the processor core and the node corresponding to the low-power mode, and a separate arc between the node corresponding to the processor core and the node corresponding to the active mode. In addition, as described further herein, the arcs and corresponding arc variables can reflect relationships between the behaviors of a given set of processor elements, such as whether a particular element can be placed in a particular mode simultaneously, limits on the number of elements that can access a given element, and the like.

Based on the nodes and the arcs of the flowchart 102, the static model generator 104 generates the static model to include a set of Boolean or logical equations or expressions (collectively referred to herein as "logical equations" for ease of reference), whereby these logical equations reflect potential configurations of the processor design 101. For a child node having a single parent, the corresponding logical expression can have the following general form:

PARENT&&ARCS_PARENT→CHILD

This expression indicates that, under a set of test constraints whereby the node corresponding to the node variable PARENT is held to be true for the configuration to be verified (assigning a logical value of 1 to PARENT) and the arcs represented by the arc variables ARCS_PARENT are also held to be true for the configuration to be verified (assigning a logical value of 1 to ARCS_PARENT), the node corresponding to CHILD also is held to be true, and therefore the node CHILD is also assigned a logical value of 1. For purposes of description, the node variable CHILD is said to be "implied" by PARENT and ARCS_PARENT. To illustrate via an example, if PARENT corresponds to a processor core, ARCS_PARENT corresponds to the behavior "is placed in a low-power mode", and CHILD corresponds to the processor core being in a low-power mode, then the above expression states that "If the processor core is true (e.g. exists) in the configuration, and the processor core is placed in a low power mode in the configuration, then the processor core being in a low-power mode is true for the configuration." As described further herein, the logical equations of the static model 110 can also reflect more complex relationships. For example, the logical equations can reflect whether a child having multiple parents can simultaneously be implied by multiple parents and their corresponding arcs.

The design verification system 100 includes a solver 106 to process the logical equations of the static model 110 to generate a solution 118 and coverage data 119. The solution 118 reflects whether, or how, the logical statements reflected by the static model 110 can each be resolved so that there are no logical inconsistencies in the logical equations, based on a set of constraint data 115. The constraint data 115 includes a plurality of constraint data sets, whereby each constraint data set indicates which node variables and arc variables of the static model 110 should be assigned a logic value of "1", indicating that the corresponding elements and behaviors of the processor design 101 are to be held to be true for purposes of generating the solution 118, and which node variables and arc variables should be assigned a logic value of 0, indicating that the corresponding elements and behaviors are to be held to be false for purposes of generating the solution 118. The solver 106 assigns the indicated logic values to the corresponding elements and arcs in the logic equations of the static model 110, and identifies whether each of the logic equations can be resolved such that there are no inconsistencies in the results of the equations. An inconsistency indicates that the processor design 101, under the set of constraints specified by constraint data 115, is not predicted to operate according to a specification, and therefore that one or both of the processor design 101 and the specification is incorrect. For purposes of description, the solution 118 is said to be an "invalid" solution if the solver 106 identifies an inconsistency. If the solver 106 is able to resolve the logic equations such that there are no inconsistencies, the solution 118 is referred to as a "valid" solution. In at least one embodiment, the solver 106 can generate multiple valid solutions, with each valid solution showing a state of each node variable and arc variable that results in resolution of the logic equations with no logical inconsistencies. Each of the valid solutions thus indicates a valid configuration of the processor design 101 under the set of constraints specified by constraint data 115.

In response to the solution 118 being at least one valid solution, the solver 106 generates coverage data 119 to indicate the logical values assigned to each of the nodes and arcs of the static model 110. The coverage data 119 thereby reflects the particular one or more configurations of the processor design 101 for which valid solutions were identified. The coverage data 119 can therefore be analyzed to identify which configurations of the processor design 101 have been verified.

The design verification system 100 includes a constraint adjustment module 121 that identifies, based on the coverage data 119, which node variables and arc variables of the static model 110 are indicated as having been set to true values by the solver 106 in order to generate the solution 118. The constraint adjustment module 121 further identifies whether any of the configurations of true values for the node variables and arc variables match any set or sets of constraints at the constraint data 115 and if so, it marks the matching set of constraints as complete. The solver 106 then proceeds to attempt to generate a valid solution for the next set of constraints at the constraint data 115 that has not been marked as complete. The constraint adjustment module 121 thus reduces the number of times that the solver 106 has to generate a solution, thereby reducing test time and resources.

To illustrate by way of example, the static model 110 can include nodes designated nodes "A", "B", "E", "F", and "P". The following table lists three sets of constraint data, each illustrating a particular configuration of the electronic device design associated with the static model 110:

TABLE

Example Sets of Constraint Data

| CONSTRAINT SET | TRUE NODES |
|---|---|
| CS1 | A & B |
| CS2 | E & F |
| CS3 | P |

In operation, the design verification system first applies the constraint set CS1 to the solver 106. In response, the solver 106 sets the nodes A & B to true states, and attempts to resolve the equations of the static model 110 in such a way that there are no inconsistencies in the equations when nodes A & B are in true states. For purposes of the example, it is assumed that the solver 106 solves the equations in such a way that nodes E & F are both set to true states, but node P is not set to a true state. The solver 106 therefore generates solution 118 as a valid solution (or set of multiple valid solutions) and also generates the coverage data 119 to indicate that the valid solution (or at least one of the multiple valid solutions) required that node A, B, E, and F all be set to true states, and that node P was not set to a true state. The constraint adjustment module 121 compares the coverage data 119 to the constraint data 115 and identifies that the solution 118 includes a solution for constraint set CS2, because it includes a solution where E&F are both true. Accordingly, the constraint adjustment module 121 adjusts the constraint data 115 to mark both CS1 and CS2 as complete. The design verification system 100 then identifies that the next set of constraint data not marked complete is CS3, and applies that constraint data to the solver 106 to generate another solution 118.

In the above example, testing of the configurations CS1, CS2, and CS3 required only two applications of constraint data sets to the solver 106. In contrast, if the constraint adjustment module 121 were not employed, each set of constraint data would need to be applied to the solver 106 individually, requiring three applications of constraint data. In scenarios where the constraint data 115 includes hundreds, thousands, or even greater numbers of constraint sets, the constraint adjustment module 121 can substantially reduce the number of applications of different constraint sets, thus reducing test time and resources.

Figure 2:
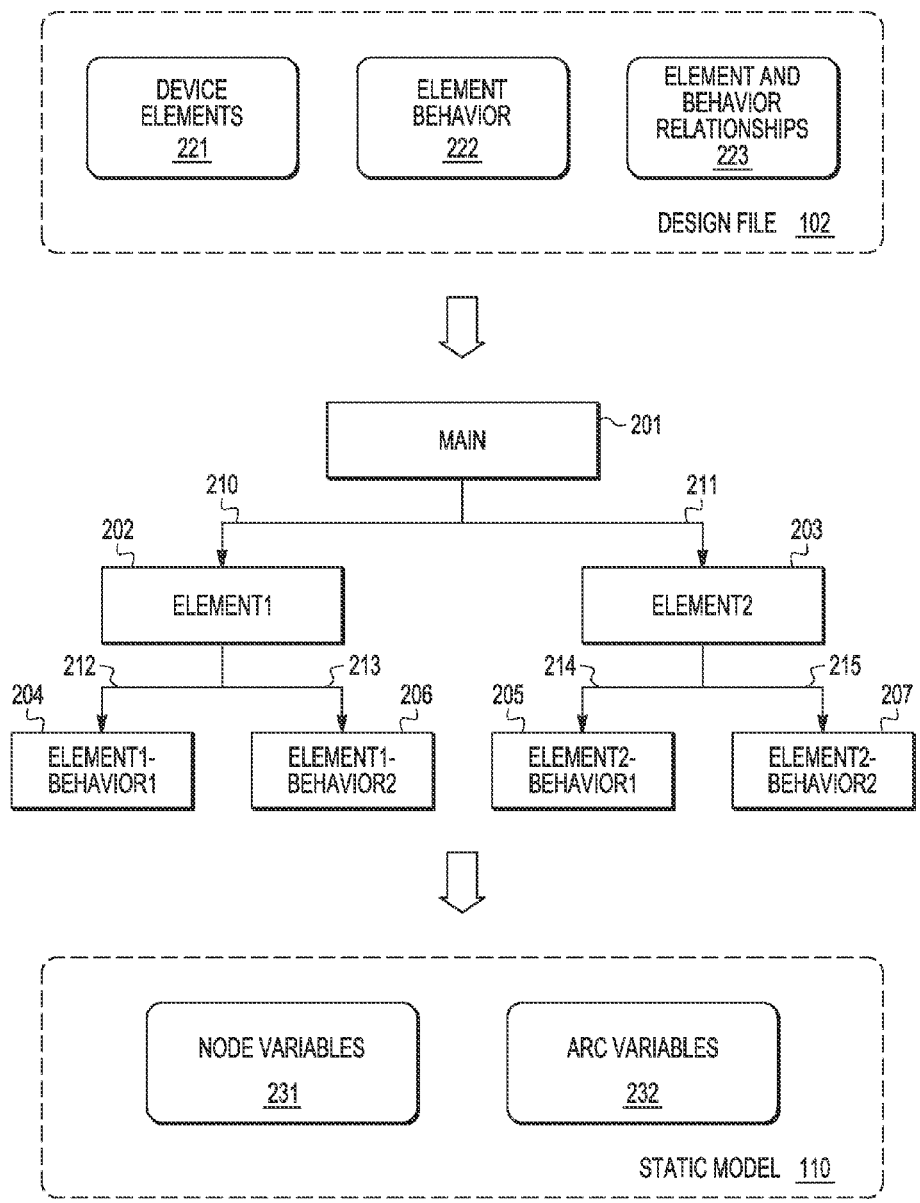
FIG. 2 is a diagram illustrating generation of a static model by the design verification system of FIG. 1 in accordance with at least one embodiment.

Generation of the static model 110 in accordance with at least one embodiment can be better understood with reference to FIG. 2. In the illustrated example, the flowchart 102 includes device elements 221, element behaviors 222 and element and behavior relationships 223. The device elements 221 reflect individual modules of the processor design 101. The device elements 221 can be identified at any desired level of granularity. Thus, in one embodiment, the device elements 221 reflect individual logic gates of the processor design 101. In another embodiment, the device elements 221 reflect "higher-level" components such as processor cores, memory controllers, and the like. The element behaviors 222 indicate the potential behaviors of the device elements 221 reflected in the processor design 101. Thus, the element behaviors 222 reflect aspects of the device elements 221 such as power modes, communication modes, other operational modes, element protocols, and the like. The element and behavioral relationships 223 indicate implications of behavior for each of the device elements 221 and element behaviors 222 on others of the device elements 221 and element behaviors 222. For example, if a processor core (a device element 221) is placed in a given power mode (as reflected in the element behavior 222) it can imply that a memory controller (another of the device elements 221) is also placed in the low-power mode (as reflected in the own behavior 222) the implication is reflected in the element and behavior relationships 223.

In at least one embodiment, the static model generator 104 generates the static model 110 by conceptualizing the flowchart (design file) 102 as a chart similar to the illustrated flow chart 200. The flowchart 200 includes nodes 201, 202, 203, 204, 205, 206, and 207. The node 201 is referred to as a "main" or "root" node that provides an entry point for the solver 106 and the static model generator 104. The nodes 202-207 each correspond to one of the device elements 221 or a particular behavior of a device element is reflected in the element behavior 222. Thus, in the illustrated example of flowchart 200 the node 202 reflects the existence of an element designated "ELEMENT 1". Node 204 reflects a particular behavior of ELEMENT 1 and node 205 reflects a different behavior for ELEMENT 1. For example, in one embodiment ELEMENT 1 is a serial communications interface and nodes 204 and 205 reflect the serial communication interface being configured to communicate according to different serial communication protocols.

The flow chart 200 also illustrates arcs 210, 211, 212, 213, 214, and 215, wherein each arc represents a particular relationship between a parent node and one of its children. Thus, for example, arc 210 represents a relationship between parent node 201 and its child node 202, while arc 212 indicates a relationship between parent node 202 and its child node 204. The arcs 232 also reflect relationships between the different children of a parent.

Figure 3:
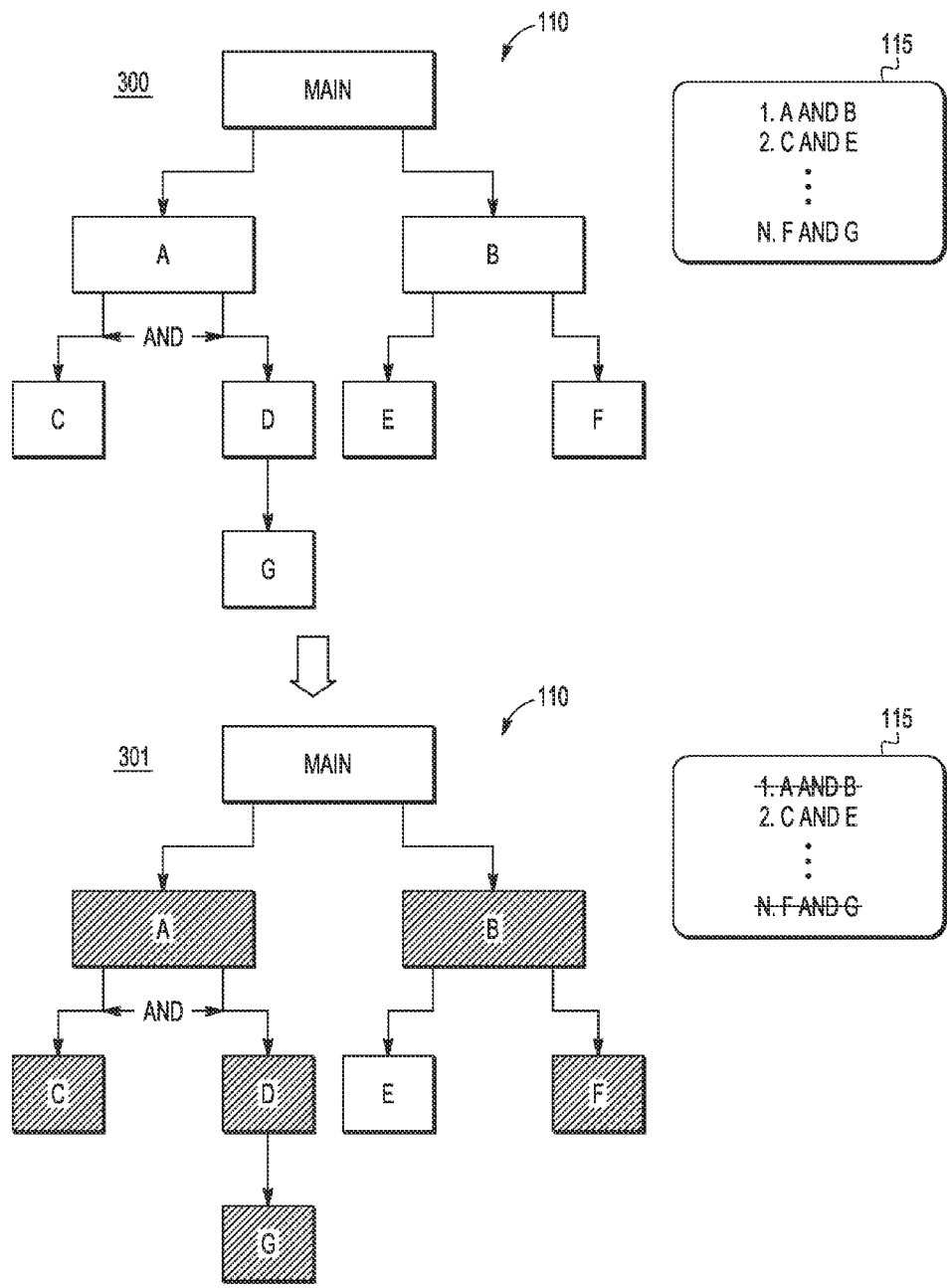
FIG. 3 is a diagram illustrating adjustment of constraint data for a static model in accordance with at least one embodiment.

FIG. 3 illustrates an example of the constraint adjustment module 121 adjusting the constraint data 115 in accordance with at least one embodiment. View 300 shows the static model 110, in the form of a flow chart, and the constraint data 115 prior to generation of any solutions by the solver 106. In the illustrated example, the static model 110 includes nodes 310-317, with node 310 labeled "MAIN" and nodes 311-317 labeled "A" through "G", respectively. Further, at view 300 the constraint data 115 includes constraint sets 1 through N, where constraint set 1 is "A & B", constraint set 2 is "C & E", and constraint set N is "F & G."

View 301 of FIG. 3 illustrates the static model 110 as solved by the solver 106 based on constraint set 1 of the constraint data 115. In the illustrated example, the solver 106 has set nodes A and B to true states, as indicated by the nodes' crosshatched backgrounds, and as required by constraint set 1. In order to generate a valid solution for the static model 110, the solver 106 has set nodes C, D, F, and G to true states. The constraint adjustment module 121 (FIG. 1) identifies, based on the coverage data 119, that the solution 118 is a solution wherein nodes F and G are set to true states, and matches these states to constraint set N of the constraint data 115. In response, the constraint adjustment module 121 marks both constraint set 1 and constraint set N as complete, as denoted by the strike-through text in view 301. The design verification system will therefore not generate an additional individual solution based on the constraint set N, saving test time and resources.

Figure 4:
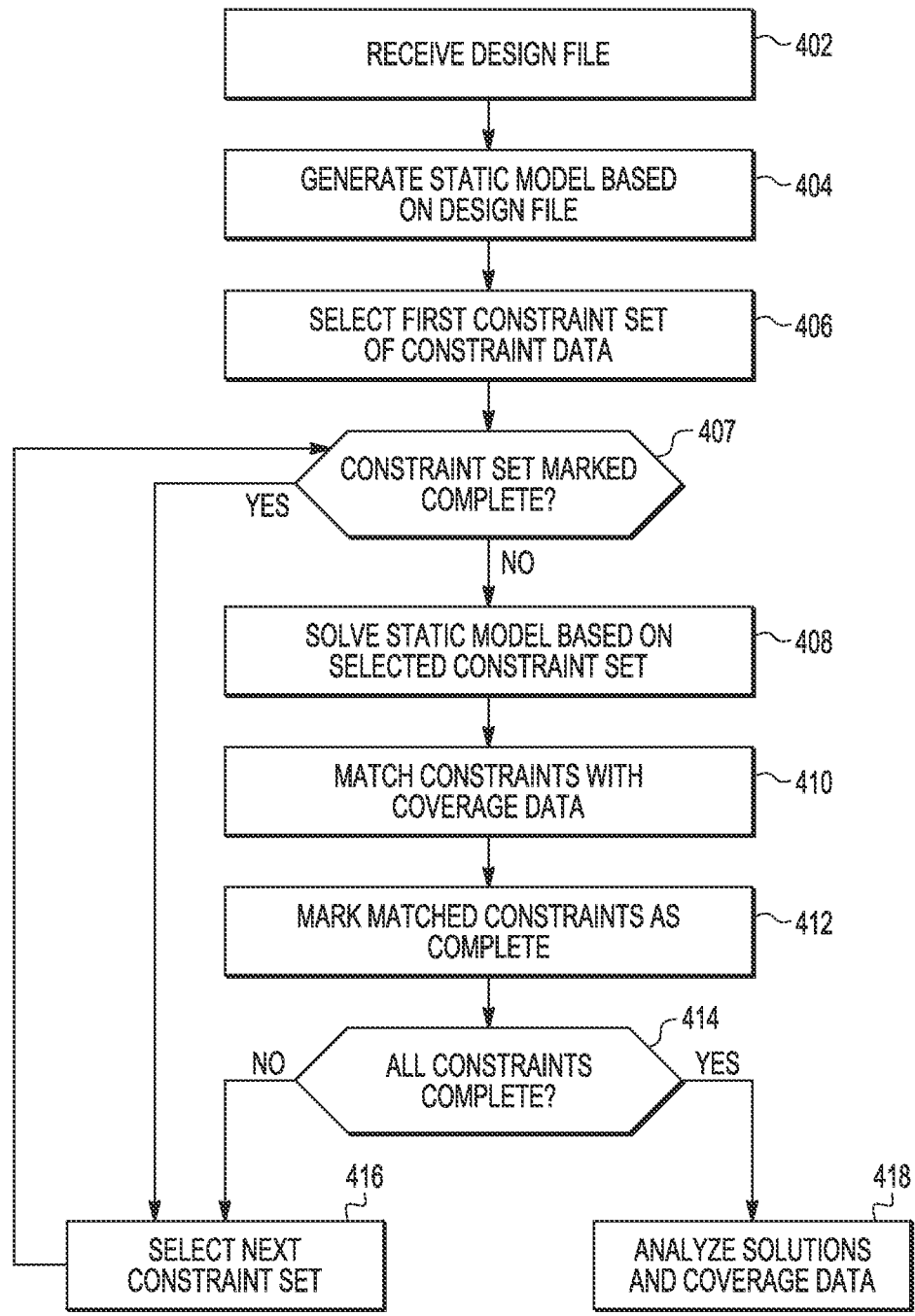
FIG. 4 is a flow diagram of a method of adjusting constraint data for solving a static model of electronic device design in accordance with at least one embodiment.

FIG. 4 illustrates a flow diagram of a method 400 of adjusting constraint data for solving a static model of electronic device design in accordance with at least one embodiment. For purposes of description, the method 400 is described in an example context of an implementation at the design verification system 100 of FIG. 1. At block 402, the static model generator 104 receives the flowchart 102. At block 404, the static model generator 104 generates the static model 110 based on the flowchart 102. At block 406 the design verification system 100 selects the first constraint set of the constraint data 115 for application at the solver 106. At block 407, the design verification system 100 identifies whether the selected constraint set has been marked as complete. If so, the method flow proceeds to block 416 and the next constraint set is selected. The method flow then returns to block 407.

If, at block 407, the design verification system 100 identifies that the selected constraint set is not marked as complete, the method flow moves to block 408 and the solver 106 solves the static model 110 based on the selected constraint set to generate the solution 118 and the coverage data 119. At block

410 the constraint adjustment module 121 matches constraint sets at the constraint data 115 with the coverage data 119. That is, the constraint adjustment module 121 identifies which node variables and arc variables were set to true states by the solver 106 to generate the solution 118. The constraint adjustment module 121 then identifies which, if any of the constraint sets at the constraint data 115 match a subset of the node variables and arc variables that were set to true states. At block 412, the constraint adjustment module modifies the constraint data 115 to mark the matched constraint sets as complete.

At block 414, the design verification system 100 identifies whether all constraint sets at the constraint data 115 have been marked as complete. If not, the method flow moves to block 416 and the design verification system 100 selects the next constraint set. The method flow returns to block 407, described. If, at block 414, the design verification system 100 determines that all of the constraint sets have been marked as complete, all solutions for the constraint data 115 have been completed. In at least one embodiment, the solutions 118 will include one solution for each user-defined coverage goal, and additional solutions for user defined constraint data not covered by a particular user-defined coverage goal. The method flow moves to block 418 and the solutions 118 and coverage data 119 can be analyzed to improve the electronic device design under test. For example, a design team can adjust one or more aspects of the device design reflected in the flowchart 102, the flowchart 102 itself, or the constraint data 115.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A computer-implemented method comprising:
    solving a static model to generate a first solution based on a first set of constraints representing a first desired configuration of an electronic device based on an electronic device design;
    generating first coverage data indicating a first configuration of the static model that resulted in the first solution;
    identifying a second set of constraints as complete based on the first coverage data, the second set of constraints representing a second desired configuration of the electronic device;
    omitting the second set of constraints from application to the static model in response to identifying the second set of constraints as complete;
    modifying the electronic device design based on a plurality solutions of the static model, the plurality of solutions including the first solution; and
    storing the modified electronic device design at a computer system.

2. The method of claim 1, further comprising:
    solving the static model to generate a second solution based on a third set of constraints representing a third desired configuration of the electronic device;
    generating second coverage data indicating a second configuration of the static model that resulted in the second solution;
    identifying a fourth set of constraints as complete based on the first coverage data; and
    omitting the fourth set of constraints from application to the static model in response to identifying the fourth set of constraints as complete.

3. The method of claim 1, further comprising:
    identifying a third set of constraints as complete based on the first coverage data, the third set of constraints representing a third desired configuration of the electronic device; and
    omitting the third set of constraints from application to the static model in response to identifying the second set of constraints as complete.

4. The method of claim 1, further comprising:
    generating the static model based on a data file describing elements of the electronic device design and relationships between the elements.

5. The method of claim 4, wherein generating the static model comprises:
    generating a set of node variables based on the data file, each node variable in the set of node variables corresponding to an element of the electronic device design.

6. The method of claim 5, wherein generating the static model further comprises:
    generating arc variables to indicate relationships between node variables.

7. The method of claim 6, wherein the first coverage data indicates logical value assigned to node variables and arc variables of the static model for solving the static model to generate the first solution.

8. A non-transitory computer-readable storage medium embodying a set of executable instructions, the set of executable instructions to manipulate at least one processor to:
    solve a static model to generate a first solution based on a first set of constraints representing a first desired configuration of an electronic device based on an electronic device design;
    generate first coverage data indicating a first configuration of the static model that resulted in the first solution;
    identify a second set of constraints as complete based on the first coverage data, the second set of constraints representing a second desired configuration of the electronic device;
    omit the second set of constraints from application to the static model in response to identifying the second set of constraints as complete;
    modify the electronic device design based on a plurality of solutions of the static model, the plurality of solutions including the first solution; and
    storing the modified electronic device design at a computer system.

9. The computer-readable storage medium of claim 8, the set of executable instructions further comprising instructions to:
    solve the static model to generate a second solution based on a third set of constraints representing a third desired configuration of the electronic device;
    generate second coverage data indicating a second configuration of the static model that resulted in the second solution;
    identify a fourth set of constraints as complete based on the first coverage data; and
    omit the fourth set of constraints from application to the static model in response to identifying the fourth set of constraints as complete.

10. The computer-readable storage medium of claim 8, the set of executable instructions further comprising instructions to:
    identify a third set of constraints as complete based on the first coverage data, the third set of constraints representing a third desired configuration of the electronic device; and
    omit the third set of constraints from application to the static model in response to identifying the second set of constraints as complete.

11. The computer-readable storage medium of claim 8, the set of executable instructions further comprising instructions to:
    generate the static model based on a data file describing elements of the electronic device design and relationships between the elements.

12. The computer-readable storage medium of claim 11, wherein the instructions to generate the static model comprise instructions to:
    generate a set of node variables based on the data file, each node variable in the set of node variables corresponding to an element of the electronic device design.

13. The computer-readable storage medium of claim 12, wherein the instructions to generate the static model further comprise instructions to:
    generating arc variables to indicate relationships between node variables.

14. The computer-readable storage medium of claim 13, wherein the first coverage data indicates logical value assigned to node variables and arc variables of the static model for solving the static model to generate the first solution.

* * * * *